United States Patent [19]
Giebel et al.

[11] Patent Number: 5,490,494
[45] Date of Patent: Feb. 13, 1996

[54] SIDE BURNER FOR BARBECUE GRILL

[75] Inventors: Michael Giebel, Joplin; Steven Speck; Randy Love, both of Neosho, all of Mo.

[73] Assignee: Sunbeam Products, Inc., Ft. Lauderdale, Fla.

[21] Appl. No.: 290,428

[22] Filed: Aug. 15, 1994

[51] Int. Cl.[6] .................................................. A47J 37/00
[52] U.S. Cl. ........................... 126/41 R; 126/38; 126/215
[58] Field of Search ................................ 126/25 R, 9 R, 126/9 B, 332–335, 41 R, 37 B, 214 R, 214 A, 214 D, 215, 216; 99/340, 448, 450, 449

[56] References Cited

U.S. PATENT DOCUMENTS

| | | |
|---|---|---|
| D. 293,067 | 12/1987 | Stephen et al. . |
| 2,861,562 | 11/1958 | Ross et al. .................................. 126/38 |
| 3,520,290 | 7/1970 | Winters ..................................... 126/334 |
| 4,524,751 | 6/1985 | Hoglund . |
| 4,886,045 | 12/1989 | Ducate, Jr. et al. . |
| 4,979,437 | 12/1990 | Giebel ..................................... 126/334 |
| 5,203,317 | 4/1993 | James . |

Primary Examiner—James C. Yeung
Attorney, Agent, or Firm—Paul D. Bangor, Jr.; Michael J. Kline

[57] ABSTRACT

A side burner for a barbecue grill comprising: a base member for housing a burner unit; a lid hingeably connected to the base member; the lid being pivotal between a closed position in which the lid covers the burner unit and an open position in which the lid has been pivoted away from the burner unit to provide access thereto; and a grid hingeably connected to the lid; the grid being movable from a first position to a second position when the lid is pivoted from the closed position to the open position.

5 Claims, 5 Drawing Sheets

5,490,494

SIDE BURNER FOR BARBECUE GRILL

FIELD OF THE INVENTION

The present invention relates to auxiliary side burners for gas-fired barbecue grills and, more particularly, to an improved side burner having an articulating cooking grid.

BACKGROUND OF THE INVENTION

Conventional gas-fired grills consist of a main grill compartment containing a gas burner positioned beneath a fire grate which supports briquettes such as lava rocks. A cooking grid on which food to be grilled is suspended above the briquettes, and heat from the burning gas is transferred to the briquettes which provides radiant heat for cooking food on the grid. Cooking methods which require heating foods in a container, such as a pot or pan, cannot practically be carried out using a conventional grill because efficient use of those methods require that the gas flame be close to or in contact with the pot or pan.

Attempts have been made in the prior art to provide cooking apparatus which combines the features of grills and conventional cookers. See, for example, the following U.S. patents:

U.S. Pat. No. 4,524,751 to Hoglund which describes a portable camp stove having a grill section and a gas burner section; U.S. Pat. No. D293,067 to Stephen, et al., showing a design for a gas-fired barbecue grill having a gas-fired side burner; and U.S. Pat. No. 4,886,045 to Ducate, Jr., et al., disclosing a detachable side cooker apparatus for a gas-fired grill.

While those prior art grills do provide means for simultaneously carrying out both a grilling operation and a pot or pan cooking operation, an improved arrangement for attaching an auxiliary burner to a gas-fired grill is desirable.

Accordingly, it is a principal object of this invention to provide a new and improved side burner having an articulating grid member which allows for a low-profile when the lid of the side burner is closed.

Another object of the present invention is to provide a side burner which produces a symmetrical appearance when attached to the barbecue grill which often has a flat side table on the opposite side of the grill compartment.

Yet an additional object of the present invention is to provide a side burner that allows the barbecue grill to which it is attached to be placed or stored in a more confined space than barbecue grills having conventional side burners.

SUMMARY OF THE INVENTION

In accordance with the present invention, there is provided a side burner apparatus for a gas-fired grill which has a source of gaseous fuel and a housing having a front wall opposite to a rear wall and two opposing side walls defining a compartment for a main gas burner. The side burner apparatus comprises a base member, an auxiliary gas burner supported within the base member, and an articulating cooking grid hingeably connected to the lid of the side burner and moveable between a first position where the lid is closed and a second, operable position when the lid is open.

These and other features and advantages of the preferred embodiments of the present invention will become readily apparent from the following detailed description of the preferred embodiments, the claims appended hereto, and from the accompanying drawings illustrating the preferred embodiments of the present invention.

BRIEF DESCRIPTION OF THE DRAWINGS

In the accompanying drawings, the preferred embodiments of the invention are illustrated in which.

DETAILED DESCRIPTION OF THE PREFERRED EMBODIMENTS

Figure 1:
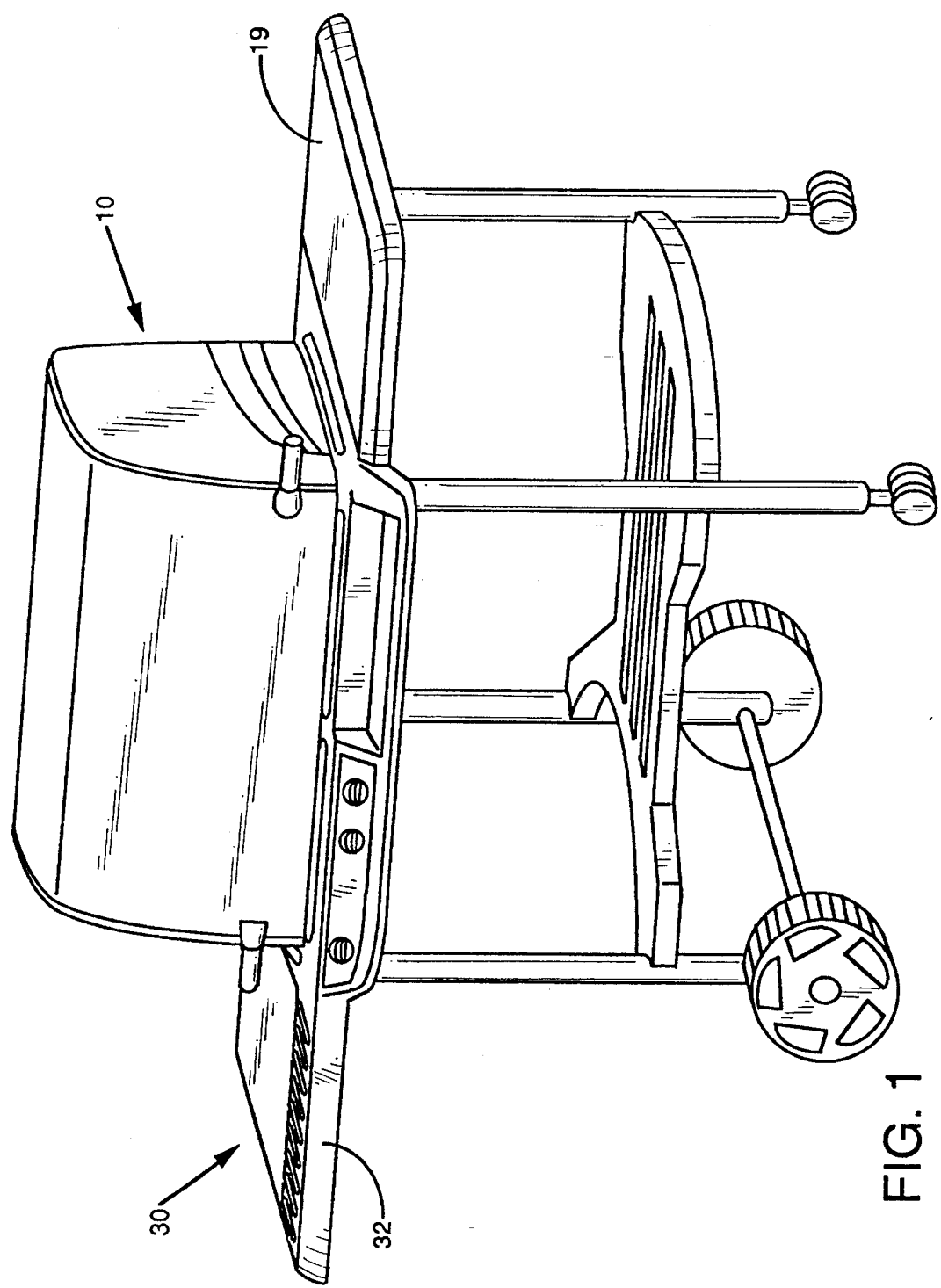
FIG. 1 is a front perspective of the side burner of the present invention shown mounted to a gas-fired barbecue grill.
Figure 2:
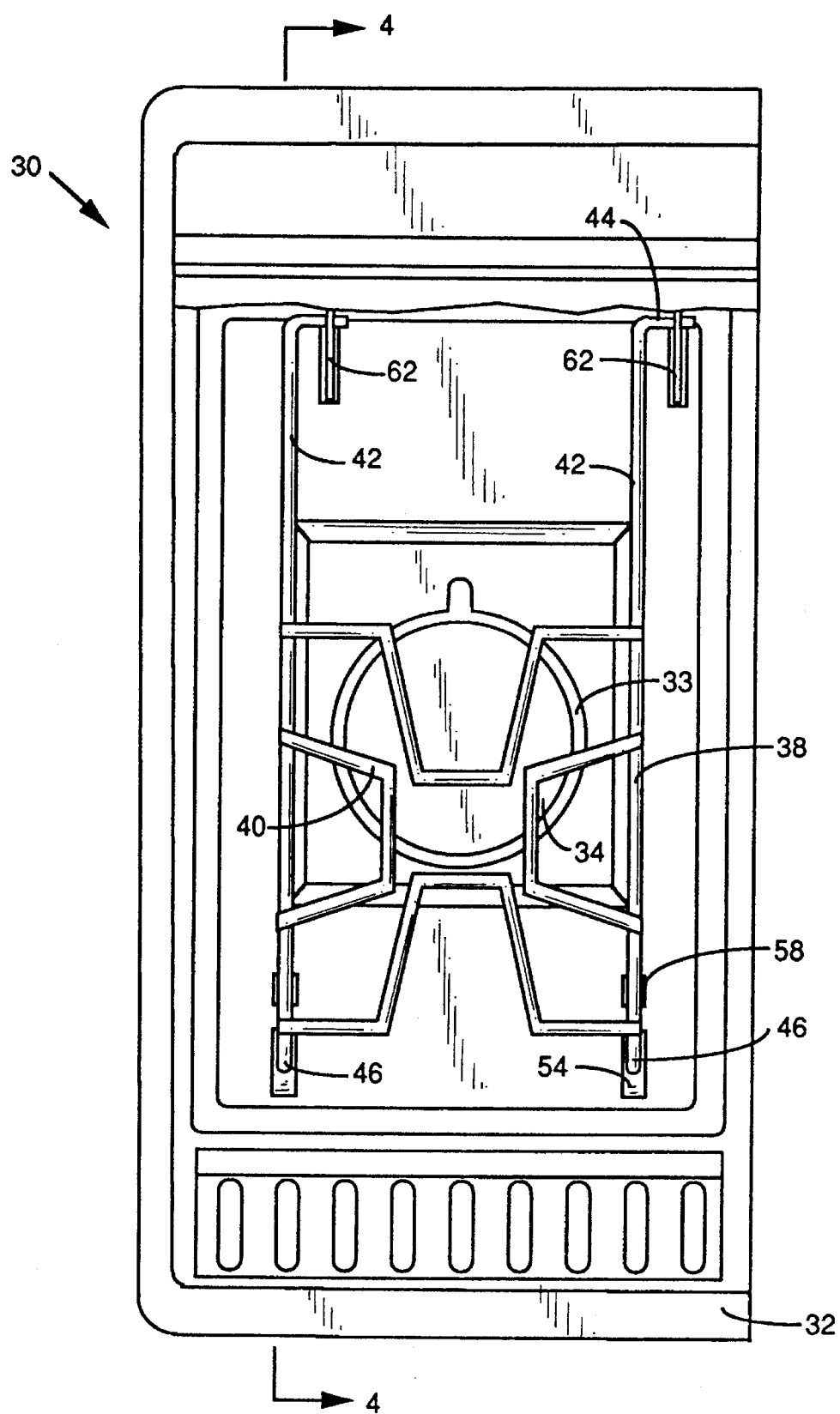
FIG. 2 is a top plan view of the side burner of the present invention with the lid in the closed position and partially cut away to show the cooking grid in its first position.

FIG. 1 shows a gas-fired barbecue grill 10 having modular side burner 30, the base member 32 of which is preferably cast aluminum. Side burner 30 is preferably bolted directly to the main body of gas grill 10. Base member 32 defines an opening 33 for receiving a gas burner unit 34. Means for supplying gaseous fuel, such as propane, and for controlling the flow rate thereof to burner unit 34 (not shown) are also provided and are well known in the art.

Referring to FIGS. 2–5, base member 32 further defines a first pair of linearly aligned depressions 50 spaced apart from a second pair of linearly aligned depressions 51. Each of the pairs of depressions 50, 51 comprising a deep depression 54 having a back wall 56 which slopes upwardly towards a shallow depression 58, which comprises the second depression of each pair. Each of the shallow depressions 58 comprises a sloped front wall 59 and a sloped rear wall 60.

Figure 3:
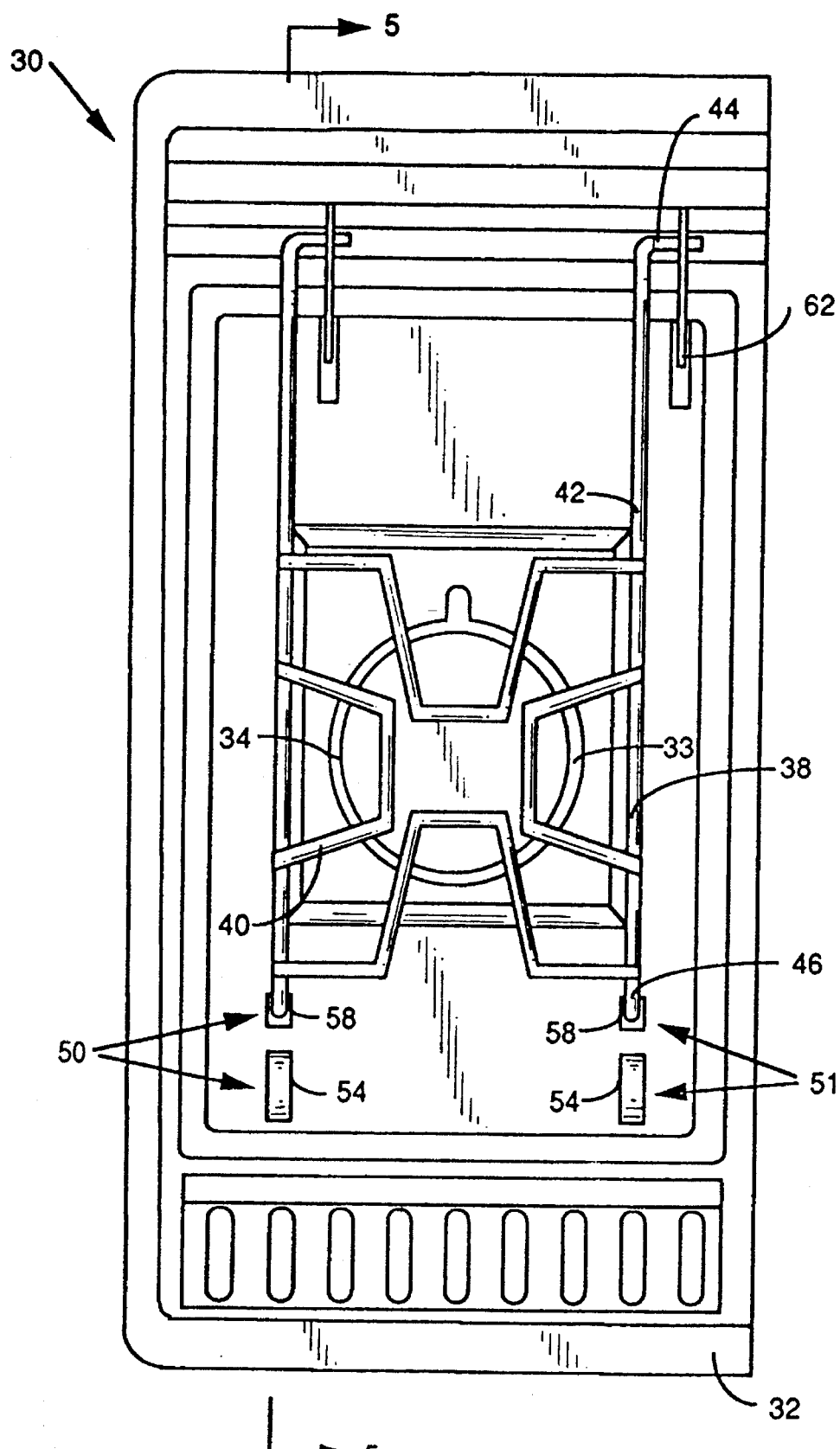
FIG. 3 is a top plan view of the side burner of the present invention with the lid in its open position showing the cooking grid in its second, operable position.
Figure 4:
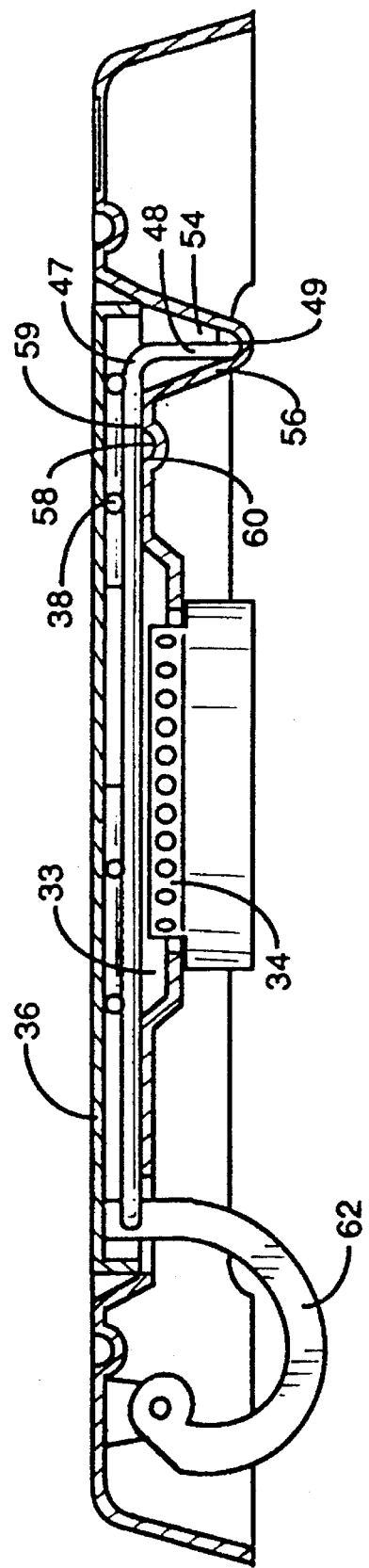
FIG. 4 is a cross-sectional view of the side burner of the present invention along Line 4—4 of FIG. 2.
Figure 5:
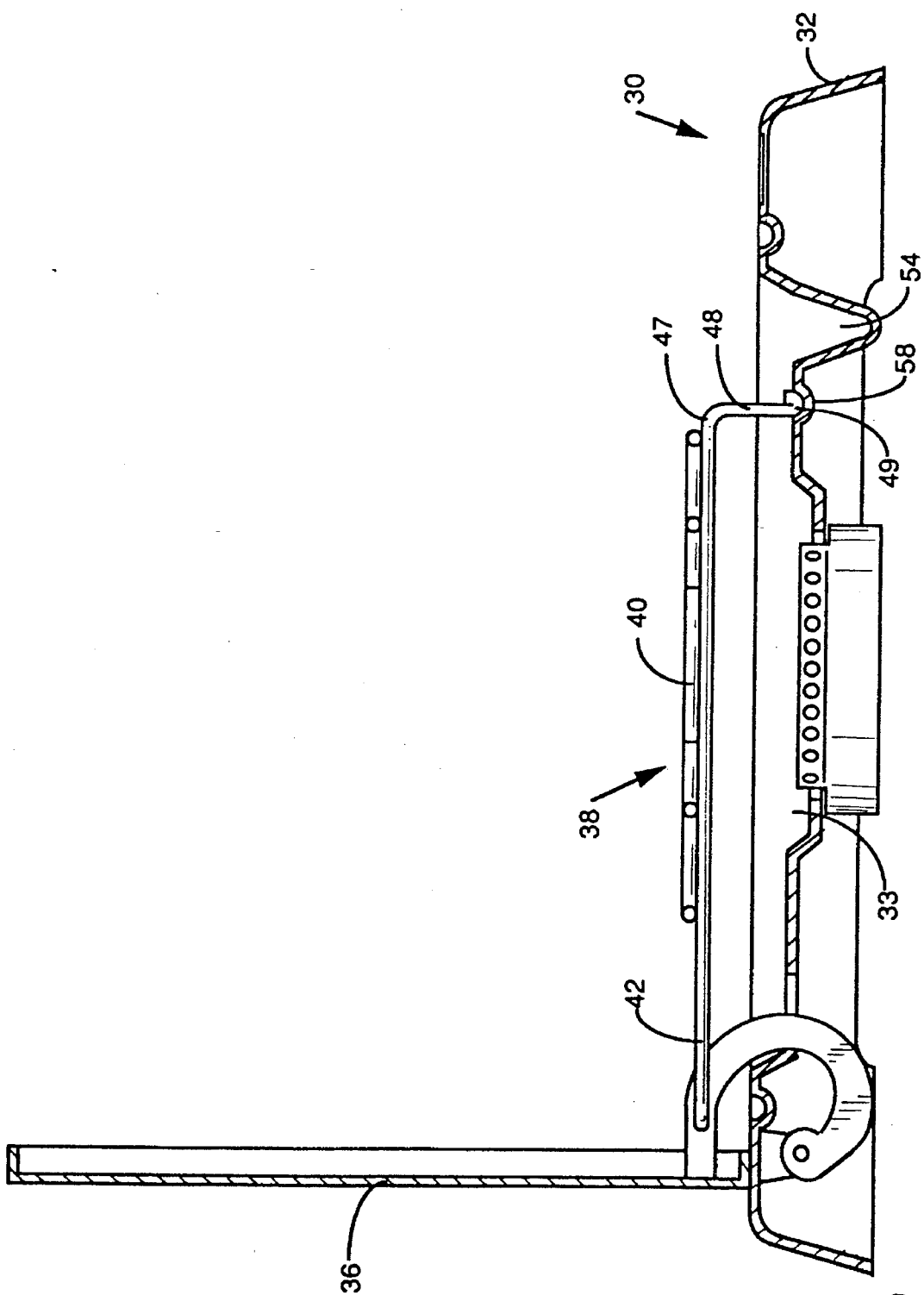
FIG. 5 is a cross-sectional view of the side burner of the present invention along Line 5—5 of FIG. 3.

Lid 36 is hingedly connected to the base member 32, via U-shaped or semi-circular hinge members 62, for pivotal movement between a closed position in which the lid 36 covers burner unit 34 (FIGS. 4 & 5) and an open position in which the lid 36 has been pivoted away from the burner unit 34 to provide access thereto for cooking (FIG. 3). A cooking grid 38 is hingeably connected to lid 36. Grid 38 comprises a body webbing 40 and a pair of spaced-apart elongated side members 42 having first and second ends 44 and 46, respectively. The first ends 44 are curved for hingeable engagement with openings in the hinge members 62 attached to lid 36. The second ends 46 of the elongated side members 42 each comprise a downwardly curved portion 47 adjacent the body webbing 40 and an intermediate section 48 disposed between the downwardly curved portion 47 and an upwardly curved foot 49.

The grid 38 is movable from a first position, wherein the upwardly curved feet 49 are seated in the deep depressions 54, to a second, operable position when the lid 36 is pivoted from its closed position to its open position. The feet 40 slide up the back walls 56 of the deep depressions 54 and into shallow depressions 58 when the lid 36 is pivoted from its closed position to its open position. When the grid 38 is in the second position, the upwardly curved feet 49 are located in the shallow depressions 58 and the body webbing 40 of the grid 38 is located directly above the burner unit 34.

The front and rear walls 59 and 60, respectively, of the shallow depressions 58 are sloped such that a pre-determined amount of force is required to slide the feet 49 out of the shallow depressions 58 in order to pivot the lid 36 toward or away from the burner unit 34. Shallow depressions 58 thereby provide means for releasably retaining the lid 36 and the grid 38 in their open and second positions, respectively. More specifically, the lid 36 is secured in its open position by the feet 49 resting in the shallow depressions 58 and arrested from movement by the sloped front and rear walls thereof 59 and 60, respectively. This feature protects against the inadvertent closure of the lid 36 by the wind or other forces, especially during cooking.

When the user desires to close the lid 36, he or she may lift the cooking grid 38, if it is not hot, so that the feet 49 are lifted out of the shallow depressions 58 and then close the lid 36 where the feet 49 will then rest in deep depressions 54. Otherwise, if the grid 38 is hot, the user may rotate the lid 36 with sufficient force so that the feet 49 slide up the front walls 59 of the shallow depressions 58 and into the deep depressions 54 as the lid 36 is moved to its closed position. In this manner, the user need not touch the hot grid 38 in order to close the lid 36.

Additionally, the articulating grid 38 provides for a low profile of the side burner 30 when lid 36 is closed. As a result, the overall appearance of the gas grill 10 is symmetrical due to the thin, sleek look of the side burner 30 which mimics the side table 19 attached to the opposite side of the grill 10.

Although the invention has been described in detail in the foregoing for the purpose of illustration, it is to be understood that such detail is solely for that purpose and that variations can be made therein by those of ordinary skill in the art without departing from the spirit and scope of the invention as defined by the following claims, including all equivalents thereof.

We claim:

1. A side burner for a barbecue grill comprising: a base member for housing a burner unit, said base member defining at least one pair of linearly aligned first and second depressions; a lid connected to said base member; said lid being pivotal between a closed position in which said lid covers said burner unit and an open position in which said lid has been pivoted away from said burner unit to provide access thereto; and a grid connected to said lid, said grid comprising at least one foot member; said grid being movable from a first position to a second position wherein said grid is substantially centered above said burner unit when said lid is pivoted from said closed position to said open position and wherein said at least one foot member is disposed within said first depression of said at least one pair of depressions when said grid is in said first position and said at least one foot member is disposed within said second depression of said at least one pair of depressions when said grid is in said second position.

2. A side burner for a barbecue grill comprising: a base member for housing a burner unit; a lid connected to said base member; said lid being pivotal between a closed position in which said lid covers said burner unit and an open position in which said lid has been pivoted away from said burner unit to provide access thereto; and a grid connected to said lid; said grid being movable from a first position to a second position when said lid is pivoted from said closed position to said open position; wherein said grid comprises a main body webbing and a pair of spaced-apart elongated side members having first and second ends; said first ends being connected to hinge members which connect said lid to said base member, and said second ends each comprising a downwardly curved portion adjacent said main body webbing and an intermediate section disposed between said downwardly curved portion and an upwardly curved foot.

3. The side burner of claim 2, wherein said base member defines a first pair of linearly aligned depressions spaced apart from a second pair of linearly aligned depressions, each of said pairs of depressions comprising a deep depression having a back wall which slopes upwardly towards a shallow depression.

4. The side burner of claim 3, wherein said feet of said side members are located within said deep depressions when said lid is in said closed position and wherein said feet slide up said back walls of said deep depressions and into said shallow depressions when said lid is pivoted from said closed position to said open position.

5. The side burner of claim 4, wherein each of said shallow depressions comprises front and rear walls configured such that a pre-determined amount of force is required to slide said feet out of said shallow depressions in order to pivot said lid toward or away from said burner unit.

* * * * *